3,256,306
ORGANOMANGANESE CARBONYL COMPOUNDS
AND THE PROCESS FOR THEIR PREPARATION
Rex D. Closson, Northville, and Thomas H. Coffield,
Farmington, Mich., assignors to Ethyl Corporation,
New York, N.Y., a corporation of Virginia
No Drawing. Filed Apr. 17, 1961, Ser. No. 103,237
21 Claims. (Cl. 260—429)

This application is a continuation-in-part of application Serial No. 801,999, filed March 26, 1959 and now abandoned, which is in turn a continuation-in-part of application Serial No. 645,675, filed March 13, 1957 and now abandoned.

This invention relates to novel organometallic compounds and more specifically, to alkyl and aralkyl manganese carbonyl compounds wherein manganese is bonded to an alkyl or aralkyl radical and a plurality of carbonyl coordinating groups.

It is an object of this invention to provide a novel class of alkyl and aralkyl manganese carbonyl compounds. A further object is to provide a process for the preparation of alkyl and aralkyl manganese carbonyl compounds. Other objects of this invention will become apparent from a reading of the following detailed description of the instant invention.

The objects of this invention are accomplished by providing compounds represented by the formula:

$$RMn(CO)_5$$

In this formula, "R" represents a univalent alkyl or aralkyl group. The "R" group preferably contains from one to about 17 carbon atoms such that the compound has a molecular weight between about 210 and about 450. Although the alkyl or aralkyl group represented by R is preferably a hydrocarbon group, it may be substituted with a variety of substituent groups without changing the principle of our invention. Thus, for example, "R" can be substituted with halogen, alkoxy, aryloxy, carbamide, thioether, nitro, nitroso, and hydroxy groups. Also, "R" may contain one or more double or triple bonds without affecting the principle of our invention.

Examples of novel compounds of our invention are methyl manganese pentacarbonyl, ethyl manganese pentacarbonyl, benzyl manganese pentacarbonyl, allyl manganese pentacarbonyl, p-phenyl benzyl manganese pentacarbonyl, methallyl manganese pentacarbonyl, 3, 3-dimethyl butyl manganese pentacarbonyl, p-allyl benzyl manganese pentacarbonyl, nitroso heptadecyl manganese pentacarbonyl, hexyn-3-yl-1 manganese pentacarbonyl, 4-ureido-amyl manganese pentacarbonyl, hepten-4-yne-6-yl-1 manganese pentacarbonyl, p-methoxy benzyl manganese pentacarbonyl, 5-(p-phenoxy phenyl) amyl manganese pentacarbonyl, 4-(p-chloro phenyl) butyl manganese pentacarbonyl, nitrohexyl manganese pentacarbonyl, 4-hydroxyphenyl manganese pentacarbonyl, 4-(thiopropyl)-amyl manganese pentacarbonyl, p-tert-butyl benzyl manganese pentacarbonyl, 3-iodo butyl manganese pentacarbonyl, 3-(2-4-dibromo-phenyl)-hexyl manganese pentacarbonyl, 3-(1-naphthyl) propyl manganese pentacarbonyl and the like.

Although our invention is directed to compounds of manganese, compounds of technetium and rhenium may be formed in like manner. These metals are equivalent to manganese for purposes of our invention.

The alkyl or aralkyl manganese pentacarbonyl compounds may be prepared by a novel process which comprises treating an alkali metal manganese pentacarbonyl compound with an organic alkylating agent. The alkylating agent reacts with the alkali metal manganese pentacarbonyl compound to form an alkali metal salt and an alkyl or aralkyl manganese pentacarbonyl compound, $RMn(CO)_5$, in which the alkali metal of the alkali metal manganese pentacarbonyl reactant has been replaced with an alkyl or aralkyl group, R. The alkylating agents used in this process are those which furnish a primary alkyl group that replaces the alkali metal in the alkali metal manganese pentacarbonyl. The resulting product is a primary alkyl or aralkyl manganese pentacarbonyl.

A preferred embodiment of this invention comprises reacting an alkali metal manganese pentacarbonyl compound with an alkyl halide or sulfate of aralkyl halide or sulfate. It has been found that when any of these reagents are employed, a smooth reaction leading to a high yield of alkyl or aralkyl manganese pentacarbonyl compounds is obtained.

The alkali metal manganese pentacarbonyl intermediate is prepared by the reaction of an alkali metal with manganese carbonyl using an ether as a solvent. The alkali metal is conveniently reacted as a dispersion in an inert carrier or as an amalgam. The amalgam is preferred as its use ordinarily gives an easily conductible reaction and a higher yield of alkali metal manganese pentacarbonyl. The alkali metals include lithium, sodium, potassium, rubidium, cesium, and francium. Of these, lithium, sodium, and potassium are most applicable to the preparation of an alkali metal manganese pentacarbonyl. Sodium is particularly preferred as it is a readily available material and its use leads to ultimately high yield of alkyl and aralkyl manganese pentacarbonyl compounds.

The reaction between an alkali metal manganese pentacarbonyl and the organic alkylating agent to produce an alkyl or aralkyl manganese pentacarbonyl is also conveniently conducted in an ether medium and thus, the alkali metal manganese pentacarbonyl intermediate may be used without isolation. It has been found that high yields of alkyl or aralkyl manganese pentacarbonyl compounds are obtained when the ether solvent has a boiling point in excess of 25° C. The cyclic ethers have been found to give excellent yields of alkyl and aralkyl manganese pentacarbonyl compounds and constitute a preferred class of solvents in the practice of this invention. Thus, such ethers as tetrahydrofuran and dioxane are preferred solvents as their use leads to excellent yields of alkyl and aralkyl manganese pentacarbonyl compound of this invention.

The reaction to produce an alkyl or aralkyl manganese pentacarbonyl compound is carried out at temperatures of from about 20° C. to about 100° C., the upper limit being dependent on the boiling point of the ether solvent. The choice of temperature conditions is dependent somewhat on the nature of the reactants, and often the reaction takes place a room temperature simply upon mixing of the reactants. However, when less reactive high molecular weight alkylating agents are employed as reactants, it is convenient to conduct the reaction at a high temperature up to the reflux temperature of the solvent ether.

As pointed out, the reaction is often instantaneous upon mixing the ingredients but in order to insure a maximum yield of alkyl or aralkyl manganese pentacarbonyl compound, it is often convenient to allow the reaction to continue for up to about one hour. Reaction times of longer duration are employed but are not ordinarily necessary. The time of reaction is dependent upon the activity of the reactants and the temperature employed.

The following examples are illustrative of methods for preparing our novel compounds wherein an alkali metal manganese pentacarbonyl compound is reacted with a strong alkylating agent to form an alkyl or aralykyl manganese pentacarbonyl compound. In these examples, all parts and percentages are by weight unless otherwise stated.

EXAMPLE I

A solution of sodium manganese pentacarbonyl, $NaMn(CO)_5$ in tetrahydrofuran was prepared by reacting 7.8 parts of manganese carbonyl $[Mn(CO)_5]_2$ with 2.5 parts of a 50 percent sodium dispersion in mineral oil in the following manner:

A reaction vessel equipped with gas inlet and outlet means and means for agitation, heating, and cooling was flushed with nitrogen and charged with the manganese carbonyl dissolved in 88 parts of tetrahydrofuran. The sodium dispersion was added and the resulting mixture was stirred at 50° C. for three hours and then allowed to settle. The supernatant liquid was decanted and a small aliquot was titrated with hydrochloric acid. This titration indicated a high conversion to sodium manganese pentacarbonyl.

To the remaining solution was added 7.55 parts of dimethyl sulfate, $(CH_3)_2SO_4$. There was an immediate reaction accompanied by a rise in temperature, a small amount of precipitation and jellation of the mixture. After standing overnight in an inert atmosphere, the reaction mixture was added to 500 parts of ice water, shaken thoroughly and filtered. Cautious air drying was necessary since the product was quite volatile. Recrystallization from low boiling petroleum ether gave a crystalline product melting at from 94.5 to 95° C. The yield was 59.5 percent of theory and the product analyzed very closely for the carbon-hydrogen-manganese content calculated for methyl manganese pentacarbonyl, $$CH_3Mn(CO)_5.$$

*Analysis.*—Cal'd. for $C_6H_3MnO_5$: C, 34.3; H, 1.43; Mn, 26.2. Found: C, 34.5; H, 1.37; Mn, 25.4.

The infrared spectra indicates the manganese carbonyl structure with the presence of a methyl group established. The material is highly volatile and disappears rapidly in a stream of air. The compound appears to boil when heated in a melting point tube to temperatures of about 140 to 145° C.

An excellent yield of methyl manganese pentacarbonyl was also obtained when methyl iodide was used in lieu of dimethyl sulfate.

EXAMPLE II

Sodium manganese pentacarbonyl was prepared in 267 parts of tetrahydrofuran using 12.2 parts of dimanganese decacarbonyl and an excess of one percent sodium amalgam. The supernatant liquid containing sodium manganese pentacarbonyl was decanted and kept under a nitrogen atmosphere. This solution was treated with eight parts of benzyl chloride, $C_6H_5CH_2Cl$, and then heated on a steam bath for 15 minutes. A light colored precipitate formed almost immediately upon heating. Centrifugation followed by decantation of the liquid gave a light solid which was determined to be sodium chloride. The liquid solution was evaporated to dryness with reduced pressure, then the residue was sublimed at a pressure of less than one millimeter and temperatures up to 100° C. 15.75 parts of a pale yellow sublimate which were contaminated by small amounts of a bright colored liquid were collected by a cooling probe. Careful resublimation at room temperature produced a good yield of crystals melting at 37.5 to 38.5° C. This benzyl manganese pentacarbonyl was shown on analysis to contain 19.6 percent manganese, 49.7 percent carbon and 2.28 percent hydrogen which values are very close to those calculated for $C_6H_5CH_2Mn(CO)_5$. The infrared spectra shows strong carbonyl absorption and a mono-substituted benzene ring. The overall yield of benzyl manganese pentacarbonyl was 87.5 percent of theory, based on the calculated amount of sodium manganese pentacarbonyl. Based on the weight of sodium chloride recovered, the yield was 91.5 percent.

Similar results are obtained when using other aralkyl halides as reactants in place of benzyl chloride. Use of p-chlorobenzyl chloride, p-methoxy benzyl chloride, or p-phenoxy benzyl chloride give respectively p-chloro benzyl manganese pentacarbonyl, p-methoxy benzyl manganese pentacarbonyl, and p-phenoxy benzyl manganese pentacarbonyl.

EXAMPLE III

When 8.7 parts of $NaMn(CO)_5$ contained in 88 parts of tetrahydrofuran was treated with 3.2 parts of allyl chloride in a nitrogen atmosphere and the resulting mixture cautiously heated to reflux for one hour, the mixture became turbid. Removal of the solvent by distillation through a helix-packed column followed by distillation of the residues at reduced pressure gave a small yield of pale yellow liquid (allyl manganese pentacarbonyl) which solidifies on cooling to ice bath temperature. This material appears to undergo oxidative decomposition on exposure to air. The compound has a boiling point of 32° C. at 2 millimeters.

*Analysis.*—Calc'd. for $C_8H_5MnO_5$: C, 40.7; H, 2.14; and Mn, 23.3. Found: C, 41.35; H, 2.37; and Mn, 23.5.

When unsaturated alkylating agents other than allyl chloride are used in the above reaction, similar results are obtained. Thus, hexyn-3-yl chloride, hepten-4-yl bromide, and p-allylbenzyl chloride give respectively hexyn-3-yl manganese pentacarbonyl, hepten-4-yl manganese pentacarbonyl, and p-allylbenzyl manganese pentacarbonyl when reacted with an alkali metal manganese pentacarbonyl.

EXAMPLES IV

Sodium manganese pentacarbonyl was prepared from 15.6 parts of manganese pentacarbonyl and 175 parts of tetrahydrofuran and 4.32 parts of sodium amalgamated with 432 parts of mercury. To the supernatant solution resulting after separation of the amalgam was added 3.8 parts of methallyl chloride in 44 parts of tetrahydrofuran. This mixture was allowed to stand overnight under a nitrogen atmosphere and protected from light. An additional 3.8 parts of methallyl chloride in tetrahydrofuran were added. 142 parts of the tetrahydrofuran were then removed by distillation at atmospheric pressure. The reaction mixture was then distilled at a reduced pressure, and the product methallyl manganese pentacarbonyl distilled at 49 to 51° C. at about one millimeter pressure. The methallyl manganese pentacarbonyl was a liquid at room temperature, sensitive to light and air and solidified when cooled with Dry Ice.

EXAMPLE V

To a solution of sodium manganese pentacarbonyl prepared from 12 parts of manganese carbonyl in 89 parts of tetrahydrofuran and excess one percent sodium amalgam was added nine parts ethyl iodide. After stirring overnight at room temperature, the mixture was poured into about 400 parts of cold water in a separatory funnel. A red oil settled which was drawn off. This liquid was extracted four times with 75-part portions of water, dried over magnesium sulfate and distilled. The product, ethyl manganese pentacarbonyl, was isolated as a near colorless liquid, B.P. 41° (9 mm.). The infrared spectrum supported the proposed structure.

*Analysis.*—Calcd. for $C_7H_5MnO_5$: C, 37.5; H, 2.23; Mn, 24.6. Found: C, 37.6; H, 2.39; Mn, 24.2.

Other alkylating agents can be used in our process to form alkyl and aralkyl manganese pentacarbonyl compounds by reaction with an alkali metal manganese pentacarbonyl. Examples of such alkylating agents are dibenzyl sulfate, trimethyl phosphate, triethyl phosphite, 1-chlorohexyne-2, p-chlorobenzyl chloride, p-methoxybenzyl iodide, p-phenylbenzyl bromide, 1-iodo-3,3-dimethyl butane, dibutyl sulfate, and the like.

The ethers applicable to the process of this invention include the lower alkyl ethers, cyclic ethers, and ethers containing a plurality of C—O—C linkages. Those ethers which boil above 25° C. are most applicable. Examples of these include ethyl butyl ether, dibutyl ether, isobutyl iso-propyl ether, methyl neo-pentyl ether, diethyl ether of diethylene glycol, $C_2H_5OC_2H_4OC_2H_4OC_2H_5$, the dibutyl ether of diethylene glycol, tetrahydrofuran, 1,4-dioxane, 1,3-dioxane, substituted dioxanes and the like. Generally a saturated organic ether which is free of other reactive groups and which contains no active hydrogen is suitable. The ethers are free of olefinic unsaturation, and contain at least about four carbon atoms. Ethers having from four to about 12 carbon atoms are found to be most useful. As pointed out, however, the cyclic ethers, including tetrahydrofuran and dioxane, constitute a preferred type of ether.

The reaction between an alkali metal manganese pentacarbonyl and a reactive alkylating agent frequently takes place upon mixing of the alkali metal manganese pentacarbonyl solution and the reactive organic compound, and the reaction is complete in a very short time. It is, however, frequently desirable to allow the reaction to continue for as much as one hour or longer. This is particularly true where the product of the reaction is not a crystalline solid, as with a higher molecular weight alkali metal manganese pentacarbonyl or such unsaturated compounds as allyl manganese pentacarbonyl.

Good yields of manganese pentacarbonyl compounds are also obtained when the lithium, potassium, rubidium, cesium and francium salts of manganese carbonyl are employed as reactants in the same manner as illustrated in Examples I through V.

When the product of the reaction is a crystalline solid, it ordinarily is insoluble in water and thus upon dilution of the ether with water is conveniently separated from the reaction mixture by simple filtration and is further purified by sublimation or recrystallization. When the reaction product is a liquid, it is conveniently separated from the reaction mixture by fractional distillation.

Another method for making the compounds of our invention involves the decarbonylation of acyl manganese pentacarbonyl compounds. The acyl manganese pentacarbonyl compounds have the general formula:

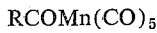

$$RCOMn(CO)_5$$

These compounds are fully described in our co-pending application Serial No. 801,996, filed March 26, 1959, now Patent No. 3,029,266. In the above formula, the term "R" has the meaning set forth in the prior portion of this specification. The method for preparing these compounds involves reacting an acylating agent such as an acyl halide or an organic acid anhydride with an alkali metal manganese pentacarbonyl compound.

Decarbonylation of the acyl manganese pentacarbonyl compound is accomplished by pyrolysis. In general, the temperature employed for pyrolysis ranges between about 20 to about 225° C. A preferred temperature is between about 50 to about 130° C. Preferably, decarbonylation is carried out under slightly reduced pressure conditions. In this process, decarbonylation is achieved most readily with acyl compounds which have no hydrogens beta to the acyl carbonyl group. These compounds formed a preferred group of compounds for use in preparing the novel alkyl and aralkyl manganese pentacarbonyl compounds of our invention. They decarbonylate cleanly to yield the alkyl and aralkyl manganese pentacarbonyl compounds.

Examples illustrating preparation of our novel compounds through decarbonylation of the corresponding acyl manganese pentacarbonyl compounds are illustrated by the following. In these examples, all parts and percentages are by weight unless otherwise indicated.

EXAMPLE VI 100 parts of acetyl manganese pentacarbonyl was placed in a sublimation apparatus under vacuum and pyrolized by gentle heating. After the compound melted (i.e., above 56° C.), there was a vigorous evolution of gas. When the gas evolution subsided, the melt was cooled and solidified. After sublimation, 56 parts (a 66 percent yield) of methyl manganese pentacarbonyl which melted at from 90 to 93° C. were obtained.

When pyrolizing B,B-dimethyl butyryl manganese pentacarbonyl, tri-tert-butyl acetyl manganese pentacarbonyl, or 2-chloro-2-(1,1-dimethylhexyl) 3,3-dimethyl octanoyl manganese pentacarbonyl, the compounds B,B-dimethylbutyl manganese pentacarbonyl, tri-tert-butyl methyl manganese pentacarbonyl and 7-(6,6-dimethyl-7-chloro-8,8-dimethyl-tridecyl) manganese pentacarbonyl are produced.

EXAMPLE VII

Two samples of perfluoroacetyl manganese pentacarbonyl, 3.1 parts and 2.0 parts respectively, were weighed separately into reaction vessels which were subsequently cooled and evacuated. The vessels were then heated carefully to the temperature of hot water, and then rapidly heated to 130–140° C. Both samples melted into yellow liquids and gas evolution was observed. Immediately after this evolution slowed, the vessels were cooled. Yellow-white solids covered the vessel interiors and these were recrystallized from carbon tetrachloride and combined to give a total of 2.9 parts (63.0 percent yield) of white crystalline perfluoromethyl manganese pentacarbonyl, M.P. 82–94° C. The infrared spectrum supported the proposed structure.

*Analysis.*—Calcd. for $C_6F_3O_5Mn$: Mn, 20.8. Found: Mn, 21.3.

When other halogen substituted reactants are used in the above reaction, similar results are obtained. Thus, decarbonylation of perbromo-acetyl manganese pentacarbonyl, perchloracetyl manganese pentacarbonyl and periodoacetyl manganese pentacarbonyl yields respectively perbromomethyl manganese pentacarbonyl, perchloromethyl manganese pentacarbonyl, and periodomethyl manganese pentacarbonyl.

EXAMPLE VIII

Sixteen parts of phenylacetyl manganese pentacarbonyl were heated to 120–125° under vacuum. After melting, gas was given off rapidly and heavy vapors appeared. At the first signs of decomposition the vessel was cooled and the crystals of the product formed on the walls. These crystals were dissolved in ether and after filtration the ether was evaporated. The crystals of benzyl manganese pentacarbonyl stayed behind. A total of 11 parts of the product could be collected (76.5 percent yield). The product melted at 38–38.5° C., indicating that the decarbonylation was virtually quantitative. The infrared spectrum of the material was identical with that of benzyl manganese pentacarbonyl from benzyl chloride and sodium manganese pentacarbonyl as shown in Example II.

Similar results are obtained when naphthylacetyl manganese pentacarbonyl, p-bromophenyl-acetyl manganese pentacarbonyl and p-phenoxyphenylacetyl manganese pentacarbonyl are decarbonylated. There are obtained naphthylmethyl manganese pentacarbonyl, p-bromobenzyl manganese pentacarbonyl, and p-phenoxybenzyl manganese pentacarbonyl.

The alkyl and aralkyl manganese pentacarbonyl compounds of this invention are useful as catalysts in what is known as the oxo synthesis of aldehydes and alcohols. An embodiment of the oxo synthesis consists of treating an olefinic hydrocarbon with hydrogen and carbon monoxide under pressure in the presence of a catalyst. When an organo manganese pentacarbonyl compound is used as the catalyst in this reaction, excellent yields of oxo synthesis products are obtained as illustrated by the following example.

EXAMPLE IX 112 parts of diisobutylene was formylated with synthesis gas at a pressure of 2000 p.s.i. and a temperature of 200° C. for a reaction time of one hour. The catalyst was methyl manganese pentacarbonyl (5 parts) and the diluent was 860 parts of hexane. $C_9$ alcohols useful in production of plasticizers were recovered in good yield from the reaction mixture.

One of the alcohols, 3,5,5-trimethyl-1-hexanol, is illustrative of the use of these compounds as plasticizers. This compound is converted to the phthalate ester by reaction with phthalic anhydride and the resulting composition is an excellent plasticizer for polyvinyl chloride and other vinyl polymers. The preparation and use of such esters is taught in British Patent 690,921, issued April 29, 1953.

The compounds of this invention are also useful as chemical intermediates. For example, bromination of the methyl and benzyl compounds gives methyl bromide and benzyl bromide, respectively, in addition to bromo manganese pentacarbonyl which is also obtained by direct bromination of manganese carbonyl.

The alkyl and aralkyl manganese pentacarbonyl compounds of this invention are effective antiknock agents when added to gasoline used in the operation of spark ignition internal combustion engines. For example, when 1.02 grams of manganese as methyl manganese pentacarbonyl was added to a gasoline having an octane number of 80, the octane number was raised to 94.3 as measured by Procedure D–908–55 of the American Society for Testing Materials. This procedure is known as the Research Method and is more fully described in the 1956 edition of "ASTM Manual of Engine Test Methods." When 2.01 grams of manganese as methyl manganese pentacarbonyl are added to this gasoline, the resulting octane number is 100.

Having fully described the nature of the present invention, and in the best modes derived for carrying it out, it is intended that this invention be limited only within the spirit and scope of the appended claims.

We claim:
1. Methyl manganese pentacarbonyl.
2. Benzyl manganese pentacarbonyl.
3. Allyl manganese pentacarbonyl.
4. Methallyl manganese pentacarbonyl.
5. Perfluoromethyl manganese pentacarbonyl.
6. Haloalkyl manganese pentacarbonyls wherein the haloalkyl radical has from 1 to 17 carbon atoms.
7. Fluoroalkyl manganese pentacarbonyls wherein the fluoroalkyl radical has from 1 to 17 carbon atoms.
8. Perhalomethyl manganese pentacarbonyls.
9. A process for preparing a compound having the formula $RMn(CO)_5$, wherein R is a radical having from 1 to 17 carbon atoms, said radical being selected from the group consisting of univalent alkyl, aralkyl, haloaralkyl, alkynylalkyl, alkenylalkyl, alkenylaralkyl, alkoxyaralkyl, phenoxyaralkyl and alkenyl radicals, said process comprising reacting an alkali metal manganese pentacarbonyl with a compound having from 1 to 17 carbon atoms, said compound being selected from the class consisting of alkyl sulfates, alkyl halides, aralkyl halides, aralkyl sulfates, haloaralkyl halides, alkynylalkyl halides, alkenylalkyl halides, alkenylaralkyl halides, alkoxyaralkyl halides, phenoxyaralkyl halides and alkenyl halides.

10. A process for preparing a compound having the formula $RMn(CO)_5$, wherein R is a univalent radical having from 1 to 17 carbon atoms, said radical selected from the group consisting of alkyl, haloalkyl, haloaralkyl, phenoxyaralkyl and aralkyl radicals, said process comprising pyrolyzing an acyl manganese pentacarbonyl having the formula $RCOMn(CO)_5$ wherein R is a univalent radical having from 1 to 17 carbon atoms, said radical selected from the group consisting of alkyl, haloalkyl, haloaralkyl, phenoxyaralkyl and aralkyl radicals.
11. The process of claim 9 being conducted in the presence of an ether solvent.
12. The process of claim 10 wherein the "R" group is one having no hydrogen atoms beta to the acyl carbonyl group.
13. Process for preparing methylmanganese pentacarbonyl, said process comprising reacting sodium manganese pentacarbonyl with dimethylsulfate.
14. Process for the preparation of methylmanganese pentacarbonyl, said process comprising reacting sodium manganese pentacarbonyl with methyl iodide.
15. Process for the preparation of benzyl manganese pentacarbonyl, said process comprising reacting sodium manganese pentacarbonyl with benzyl chloride.
16. Process for the preparation of allyl manganese pentacarbonyl, said process comprising reacting sodium manganese pentacarbonyl with allyl chloride.
17. Process for the preparation of methallyl manganese pentacarbonyl, said process comprising reacting sodium manganese pentacarbonyl with methallyl chloride.
18. Process for the preparation of methyl manganese pentacarbonyl, said process comprising pyrolyzing acetyl manganese pentacarbonyl.
19. Process for the preparation of perfluoromethyl manganese pentacarbonyl, said process comprising pyrolyzing perfluoroacetyl manganese pentacarbonyl.
20. Process for the preparation of benzyl manganese pentacarbonyl, said process comprising pyrolyzing phenylacetyl manganese pentacarbonyl.
21. Compounds having the formula $RMn(CO)_5$ in which R is a univalent radical having from one to 17 carbon atoms, said radical being selected from the group consisting of alkyl, haloalkyl, aralkyl, haloaralkyl, alkenyl, alkynyl, alkoxyaralkyl, and phenoxyaralkyl.

References Cited by the Examiner
UNITED STATES PATENTS

| | | | |
|---|---|---|---|
| 3,007,953 | 11/1961 | Closson et al. | 260—429 |
| 3,029,266 | 4/1962 | Closson et al. | 260—429 |
| 3,050,562 | 8/1962 | Klopfer | 260—429 |

OTHER REFERENCES

Hieber, W. and Wagner, G., Ann. 618, 24–30 (1958).
Hieber et al., "Z. Naturforsch," 12b 478–9 (1957).

TOBIAS E. LEVOW, *Primary Examiner.*

ABRAHAM H. WINKELSTEIN, SAMUEL H. BLECH,
*Examiners.*

W. J. VAN BALEN, T. IAPALUCCI,
*Assistant Examiners.*